April 28, 1953
W. O. BRIDGE
TRAILER FOR CARRYING GENERAL
FREIGHT AND AUTOMOBILES
2,636,772
Filed March 20, 1948
11 Sheets-Sheet 6
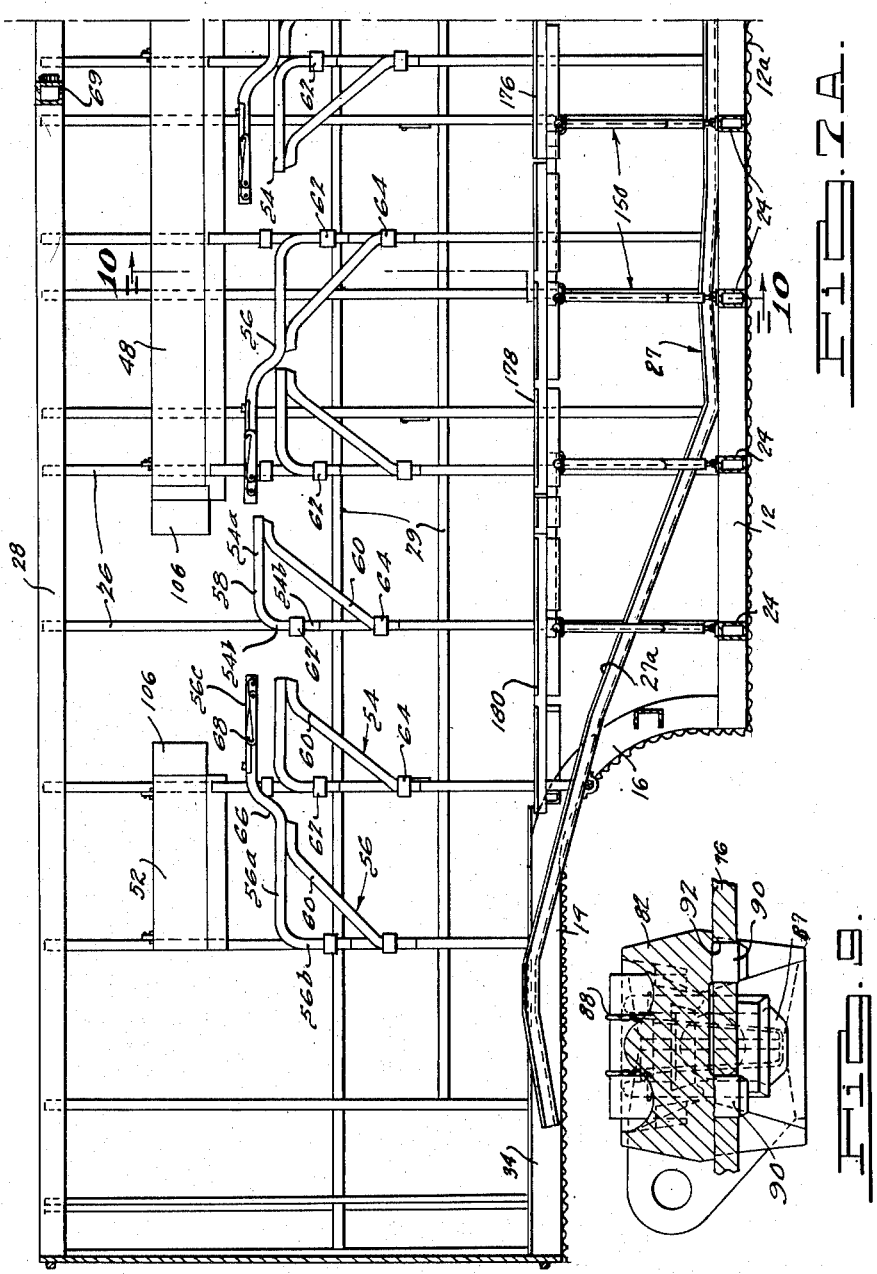
INVENTOR.
William O. Bridge.
BY
Harness, Dickey & Pierce
ATTORNEYS.

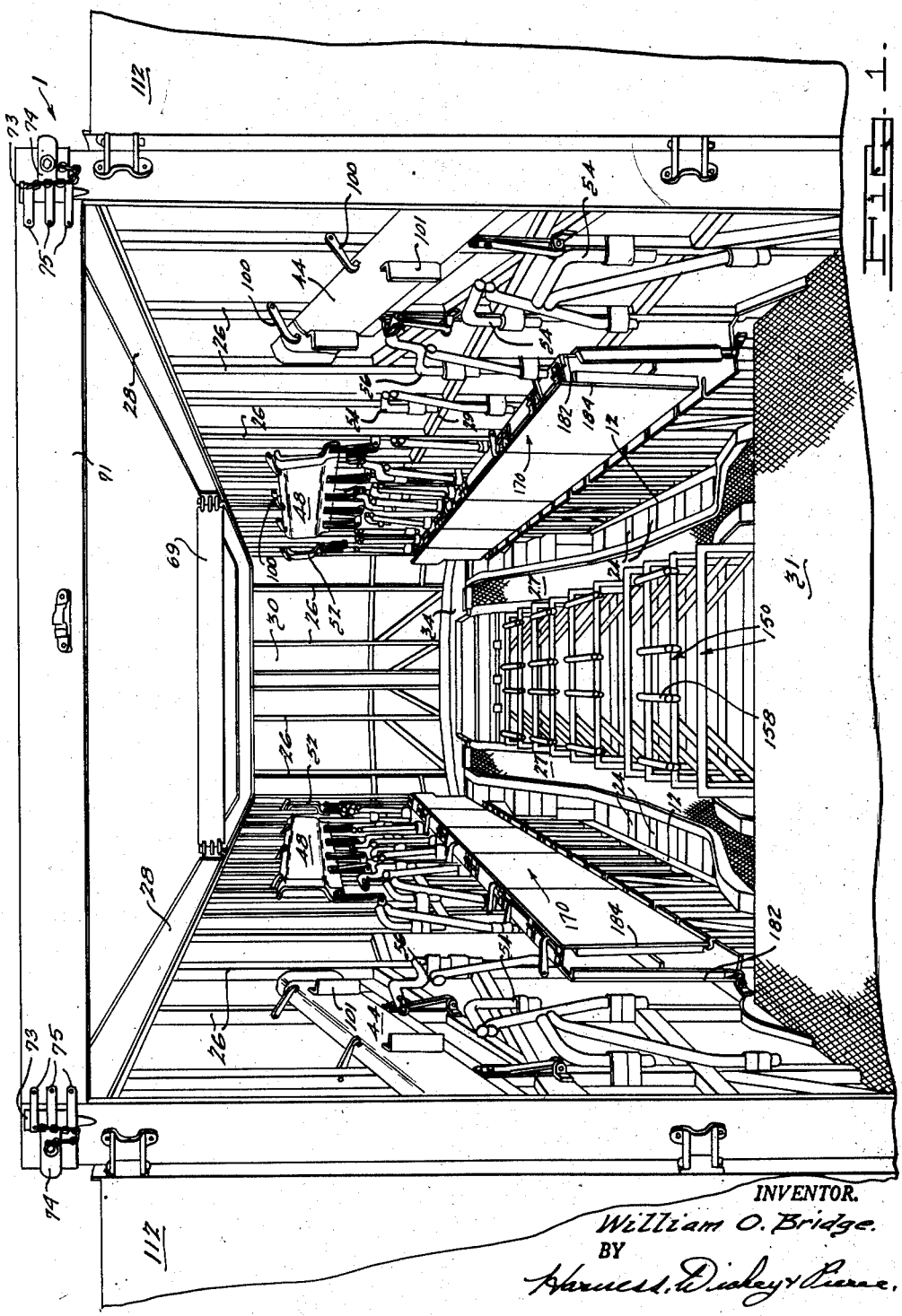

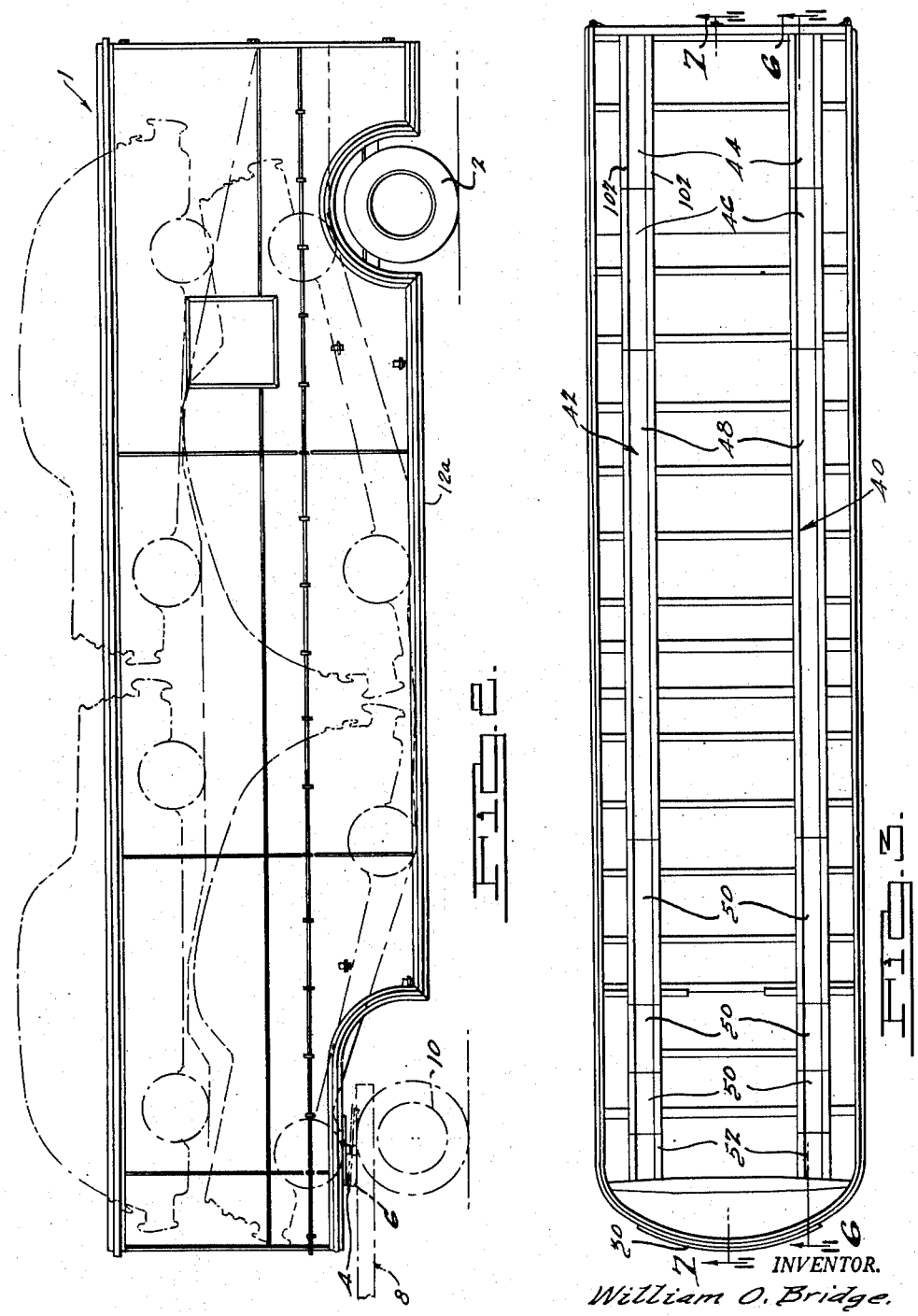

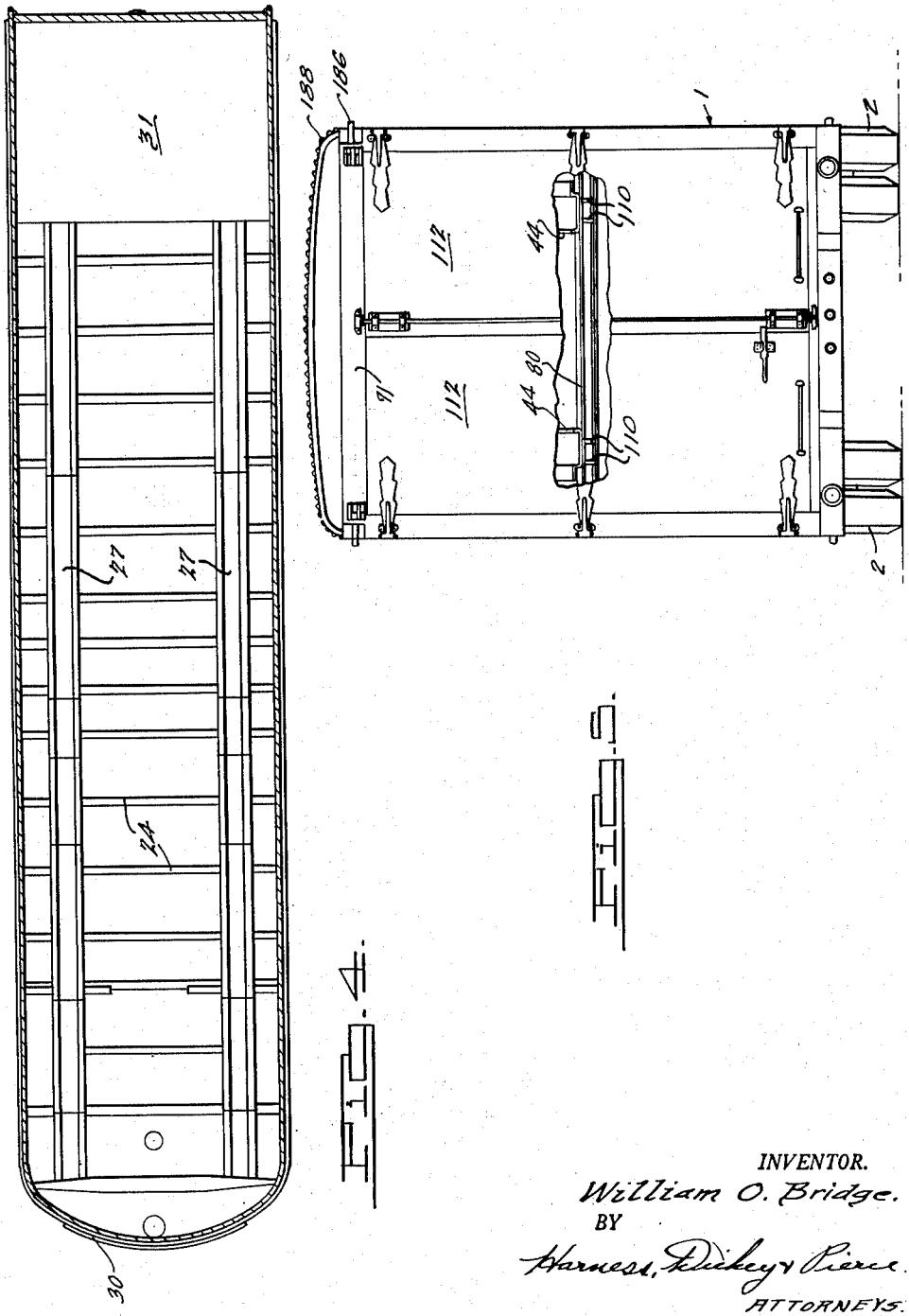

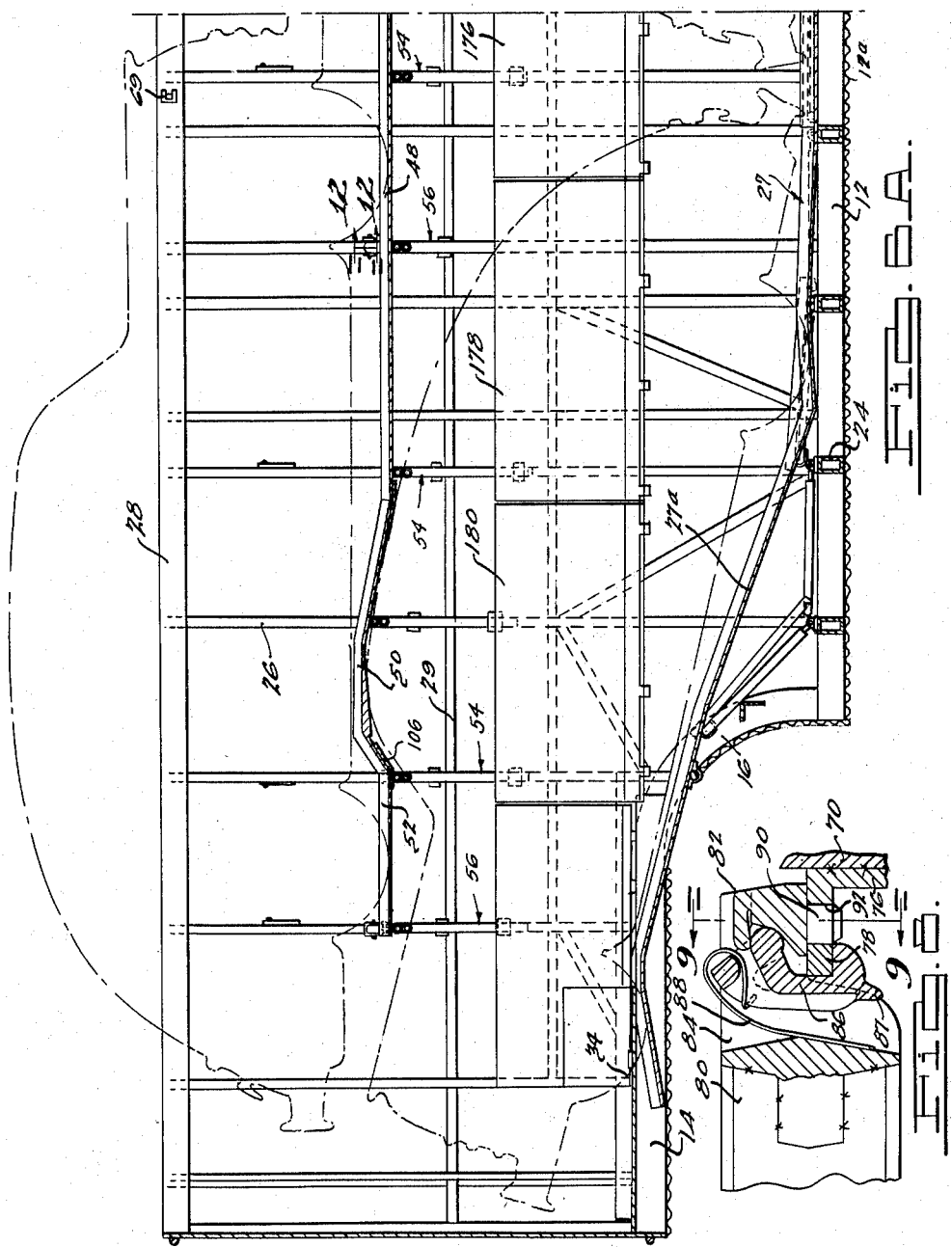

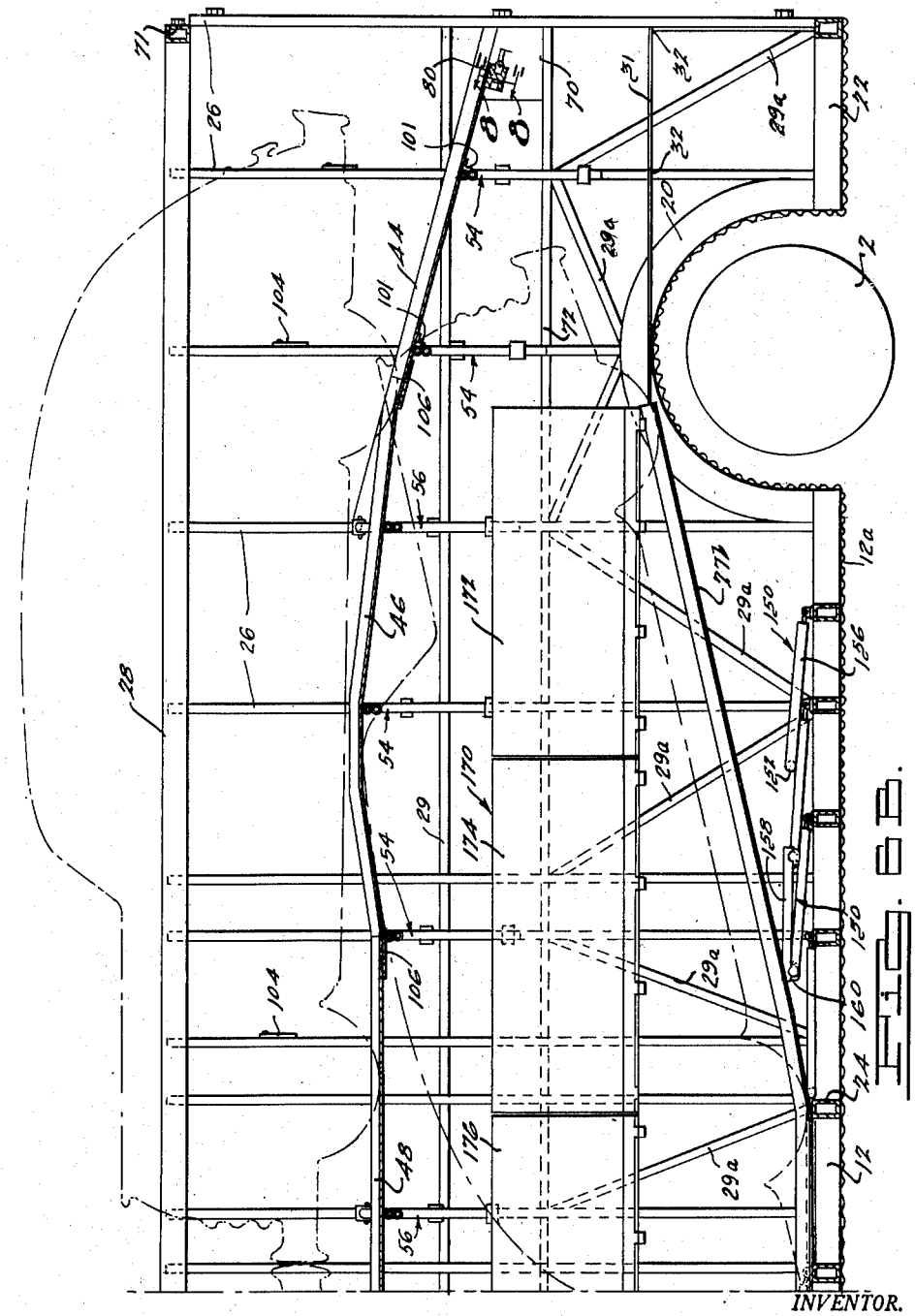

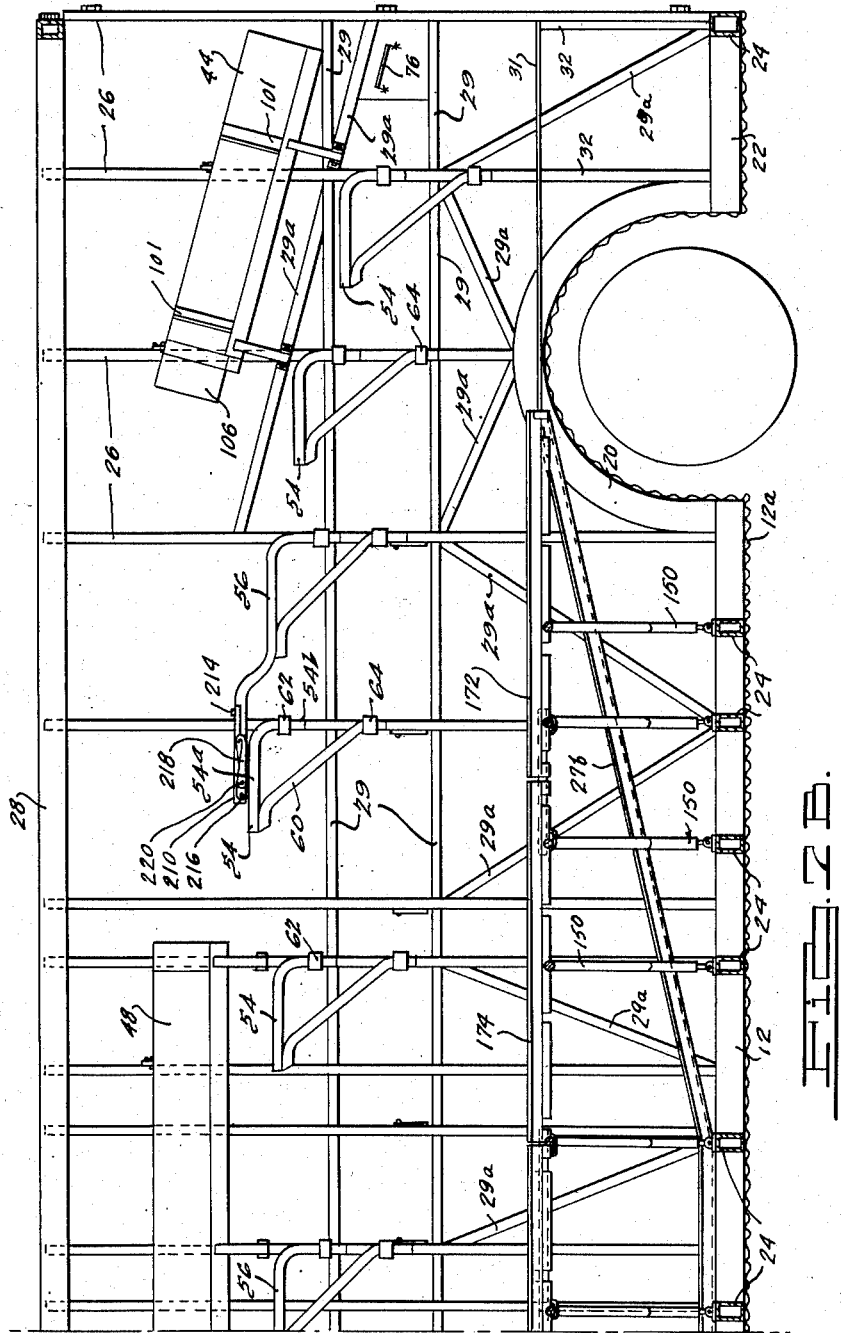

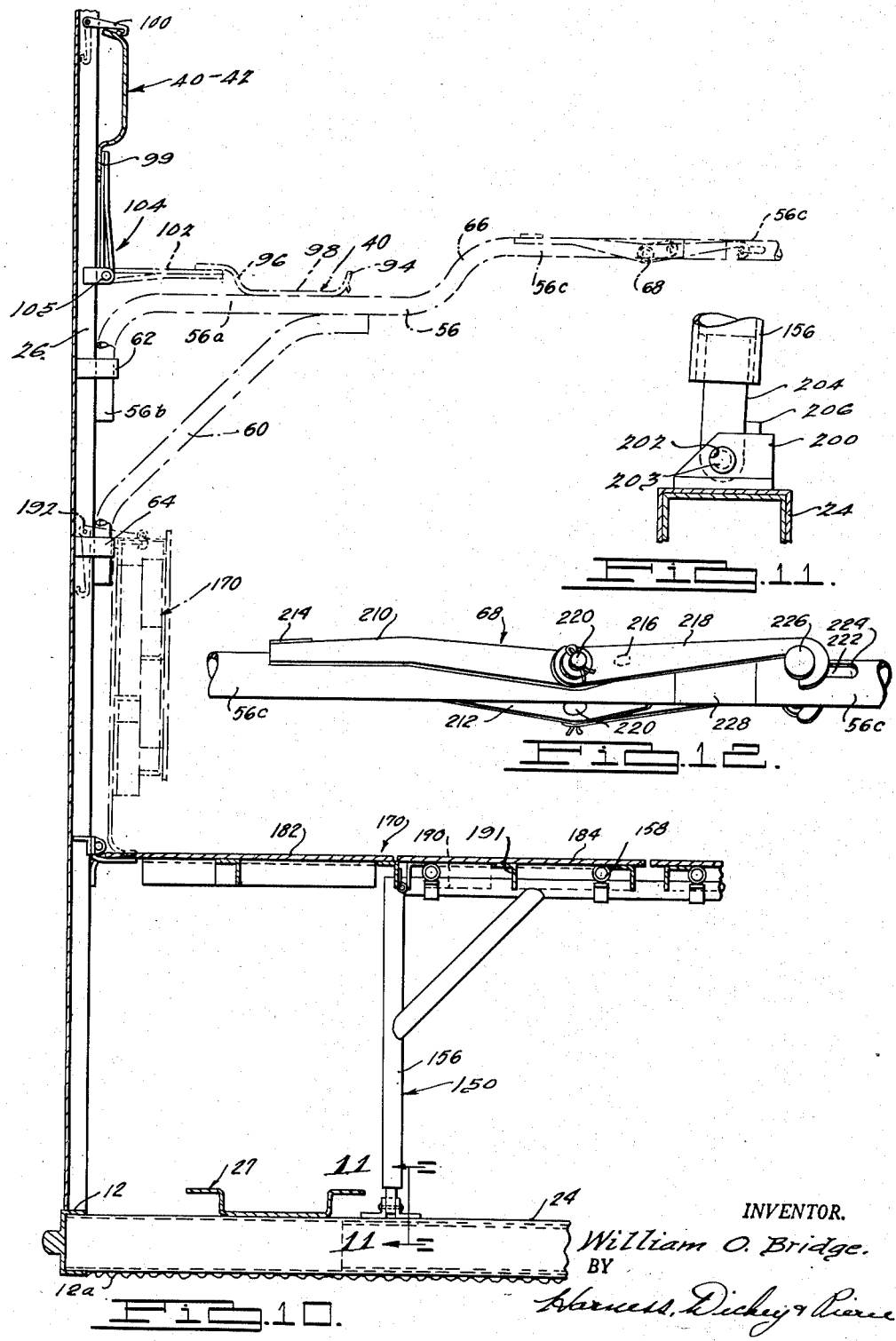

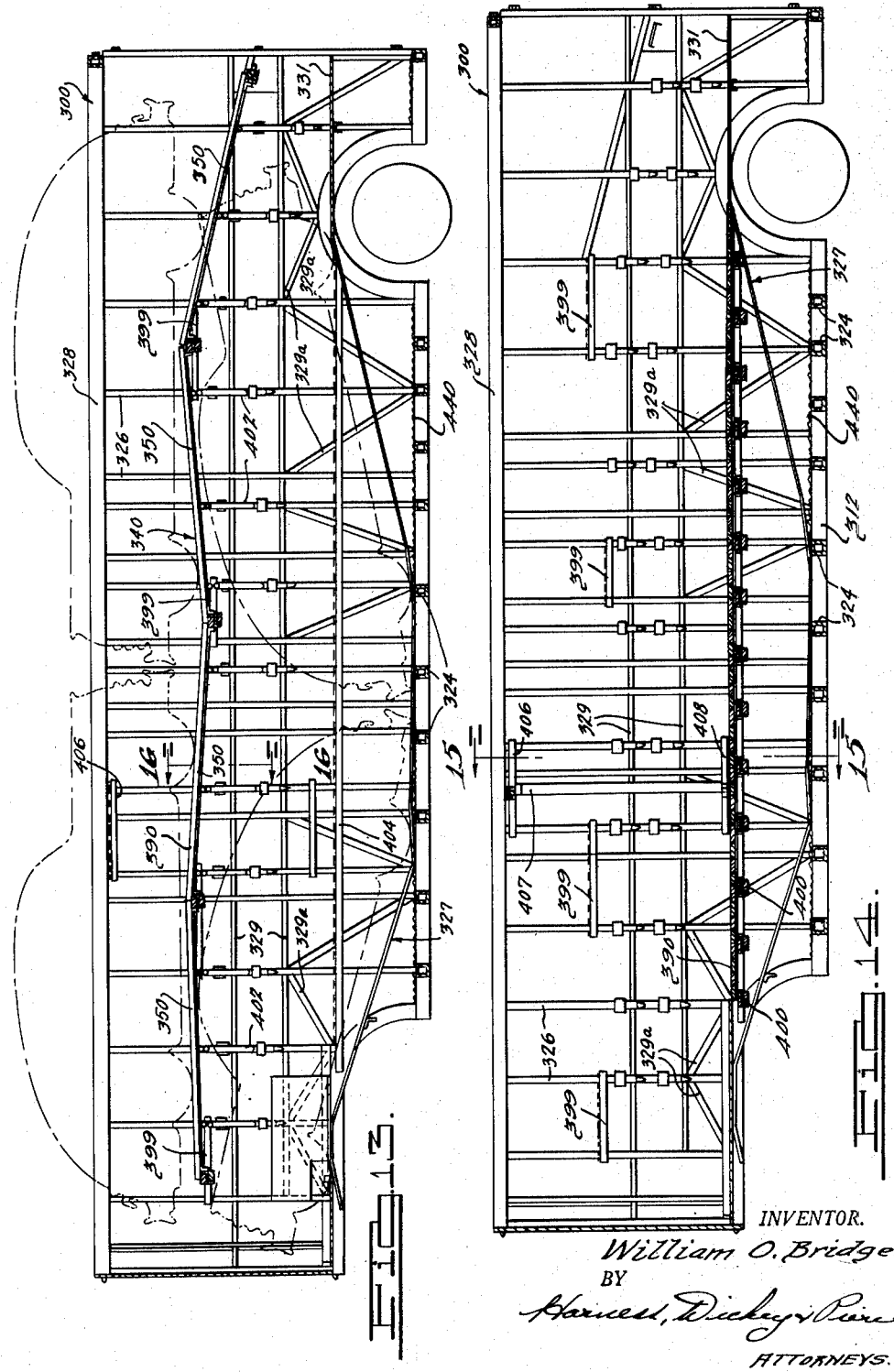

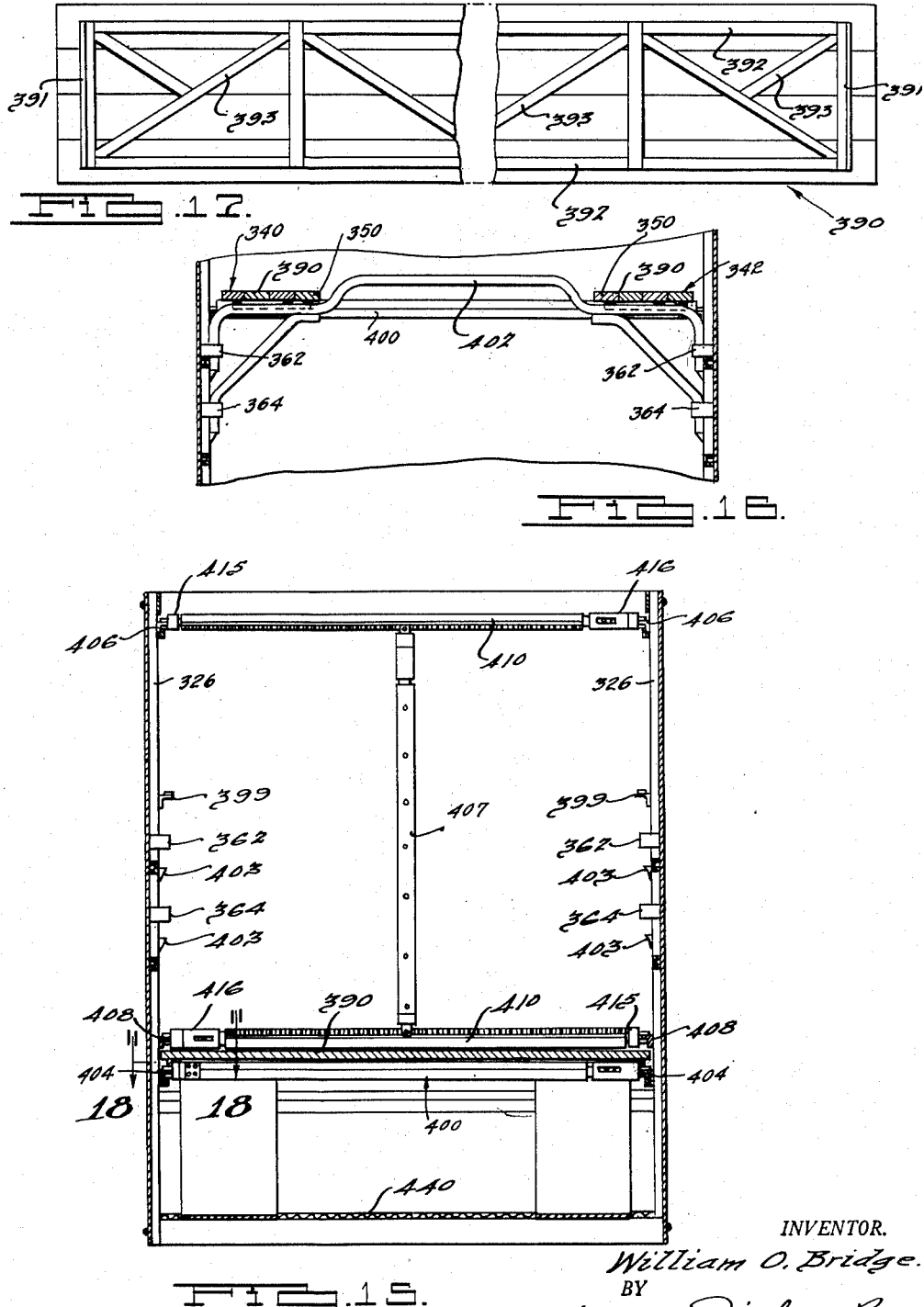

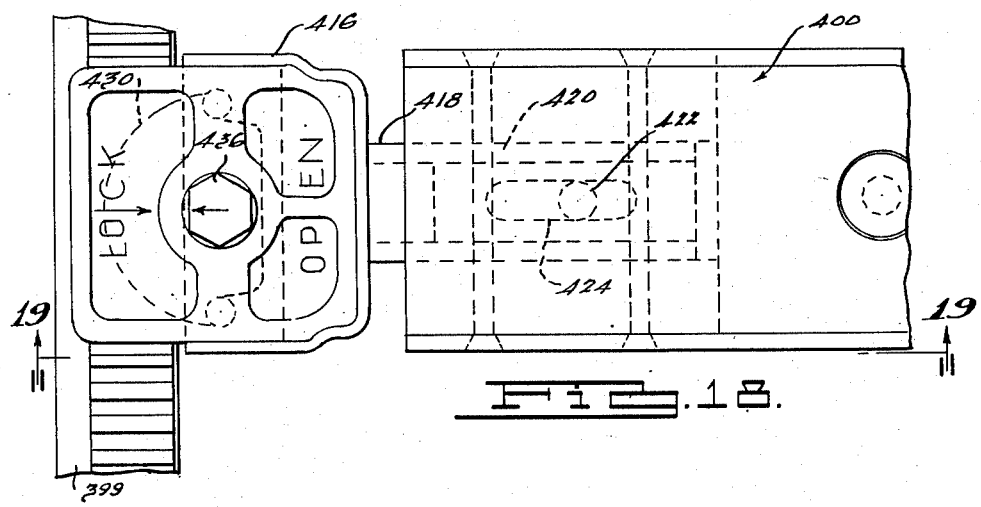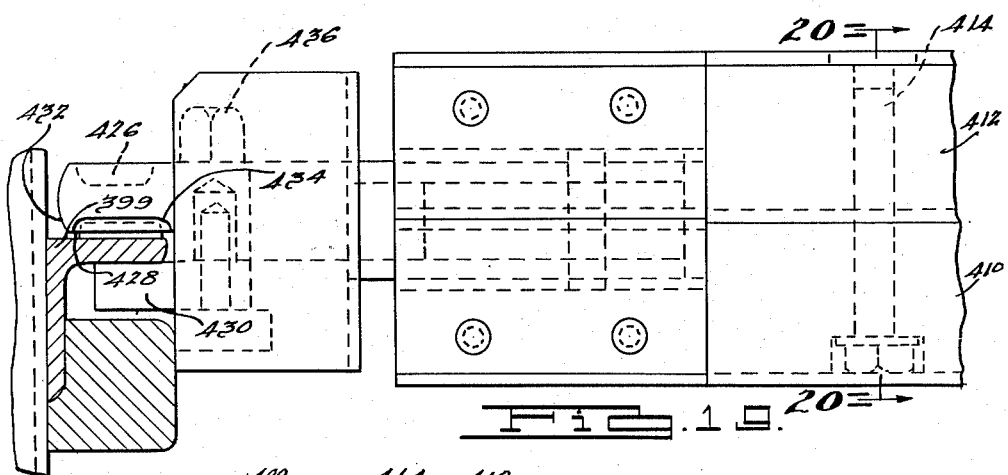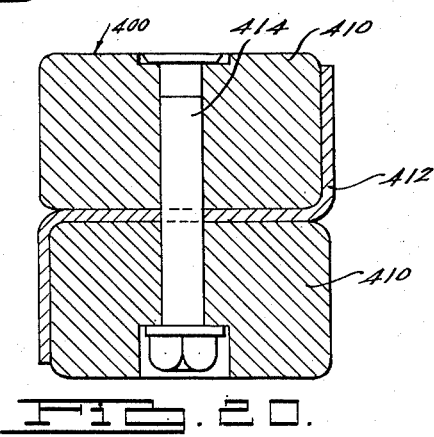

Patented Apr. 28, 1953

2,636,772

UNITED STATES PATENT OFFICE 2,636,772

TRAILER FOR CARRYING GENERAL FREIGHT AND AUTOMOBILES

William O. Bridge, Detroit, Mich., assignor to Evans Products Company, Plymouth, Mich., a corporation of Delaware Application March 20, 1948, Serial No. 16,034

13 Claims. (Cl. 296—1)

This invention relates generally to dual purpose highway vehicles, and more particularly, is directed to the provision of a dual purpose highway vehicle which can readily be converted so as to enable it to economically haul either a plurality of standard sized automobiles arranged in two levels, or to carry, predominantly upon a standard or loading dock height floor, a full volume of general merchandise.

The engineering and special requirements of highway vehicles specially designed to economically carry a plurality (at least three and preferably four) of standard sized automobiles (such vehicles being generally in the form of trailers and being commonly known as haulaways) are materially different from the requirements for highway vehicles designed to economically transport general freight.

The above has heretofore been true to such an extent that two generically different types of vehicles have been developed for these two purposes, and neither of which are adapted to economically carry both kinds of loads. Thus, while operators of the general type of freight carrying trucks or trailers endeavor and generally are able to arrange for payloads both going and coming on a particular trip, the haulaway operators have not been able to do this. Instead, the haulaways go out loaded and are obliged to return empty, since prior to the present invention it has been considered impossible to design and build an economically satisfactory vehicle for these two different types of loads.

The loading and unloading of the great bulk of general freight, commonly called dry freight, is handled from and to loading docks the height of which is rather well standardized at a figure which is of the order of four feet. The use of ramps or gang planks which connect the freight floor of the vehicles with the docks, of course, permit some variation between the heights of the docks and such freight floors but for efficient handling, particularly of heavy freight articles, these floor and dock heights should bear a reasonably close relation to each other. On the other hand, the length and height limitations on highway vehicles now imposed by law in most states, the requirements for adequate ground clearance, and the dimensions of modern automobiles, are such that it is impractical to load automobiles on a floor which meets the reasonable dock-high requirements. Instead, a satisfactorily positioned dock-high floor intercepts or lies between the upper and lower limits of the volume or space to be efficiently occupied by automobiles.

In the now preferred practice of the invention, the automobiles are arranged in superposed or decked arrangements, each deck containing at least one, and preferably two, automobiles. In another illustrative arrangement, the automobiles may be arranged in what might be called an inclined, stacked arrangement. In both of these arrangements, portions of the automobile supporting sturcture are positioned well above the loading dock height and other portions are desirably positioned well below the loading dock height. Thus, in a generic sense, the present invention may be characterized by the provision of what may be called three-level loading, the dry freight floor being at an intermediate level and the automobile carrying elements being arranged at two levels which are, respectively, above and below the dry freight level.

In another generic aspect the present invention may be considered as embracing arrangements in which at least one automobile is carried in a highway vehicle in a position so that it extends above and below the freight carrying position of a movable floor or floor portion.

With the foregoing general considerations in mind, major objects of the present invention are to provide a dual purpose highway vehicle, preferably in the form of a trailer, and which is readily convertible so that in one adjusted condition it can carry one or more, and, preferably three or four, standard or full-sized automobiles, and in another adjusted condition provides a freight carrying floor at substantially dock height, the dock height floor falling intermediate the upper and lower limits of the space occupied by the automobile or automobiles when the vehicle is in its first adjusted condition; and to provide such a dual purpose vehicle in which, under both conditions, loading and unloading takes place from the rear, whereby the strength of the vehicle side walls is not reduced by the provision of entries therein.

Further important objects of the invention are to provide a convertible highway vehicle incorporating what is generically referred to above as a three-level arrangement wherein under one condition a dry freight floor at substantially dock height is provided, and in another condition, automobile supporting means are provided at levels above and below the first-mentioned level; to provide such arrangements wherein the automobiles are arranged in superposed or decked arrangement, above and below the level of the freight floor, when the vehicle is in automobile-carrying condition, whereby the automobiles may be loaded and unloaded by driving them into place upon their respective supporting means; to provide such arrangements wherein the dry freight floor is substantially continuous from end to end and side to side of the vehicle so as to provide maximum carrying capacity therefor; to provide such arrangements wherein, when converting the vehicle from one carrying condition to another, any supporting or structural elements which are not utilized under both carrying conditions, can readily be stowed in such a way as to occupy a minimum of space; to provide such arrangements wherein the elements which form or support the freight floor and the elements which form or support at least the upper deck of automobiles, are movable, in the hereinafter defined generic sense, between active and stowed positions in which they do not interfere with the loading of automobiles on the one hand, or freight on the other hand; to provide such arrangements wherein at least certain of the structural or loading elements interchangeably serve under both loading or carrying conditions, thereby minimizing the overall number of parts which are required; and to provide such arrangements wherein at least certain of the loading elements are pilfer-proof in the sense that, while they are movable, they are not readily removable from the vehicle.

In the preferred practice of the invention, the trailer structure as a whole defines two general lower levels, or is of the drop center type. That is to say, the trailer frame structure includes a low slung intermediate portion and at least one and generally two raised end portions, the rear raised portion being used where the drive-between, tandem, rear trailer wheels are not employed, and being positioned above the usually dual rear wheels of the trailer, and the front raised portion, where used, being elevated to accommodate the usual fifth wheel connection to the tractor unit. These end portions constitute platform areas, preferably at dock height and capable of supporting either general or dry freight. They may also support the wheels at one end of one or two lower level automobiles.

It is, accordingly, a further important object of the invention to provide the aforesaid dual purpose, and preferably the aforesaid three-level arrangement, in trailer structures of the drop center type.

A further and also related object is to achieve the maximum utilization of the volume of a highway freight carrying vehicle, particularly one having a portion intermediate its length lower than its normal freight carrying floor, and more particularly one which incorporates dual purpose features as aforesaid. Under present height, width, and length limitations, as aforesaid, and with adequate ground clearance (of the order of one foot or more) the volume or well space between a dock height floor and the bottom of the drop center portion (which is preferably floored, according to the present invention) are of the order of magnitude of 30% of the volume above the dock height floor in a trailer of approximately 36-foot length. In accordance with the present invention, this substantial additional volume is utilized preferably for the carrying of so-called "balloon" or light and bulky freight, which is easy to lift in and out of the well space. In accordance with the invention, access to the well is afforded preferably by the same movement of the dock height floor portions which permits them to be stowed. Another object of this invention is to provide such a dual purpose vehicle in which all possible portions thereof are utilized or stressed to best advantage under both loading conditions and wherein the freight and automobile loading elements in fact constitute part of the frame structure of the vehicle.

Further objects of the invention are to provide improved structural members and arrangements of structural members which enable the ready and economical achievement of the foregoing generally stated objects, the details and advantages of which will become apparent from the following description and the appended claims.

In the drawings, in which like numerals are used throughout the various views to designate like parts, Figure 1 is a perspective view, looking in from the opened rear doors, showing the interior of a trailer embodying the invention, and with its parts arranged to receive the lower two automobiles, but with the upper automobile supporting tracks folded out of the way;

Fig. 2 is a view in side elevation of the trailer of Fig. 1 when it is arranged to transport automobiles, the arrangement of the automobiles being shown in dotted lines;

Fig. 3 is a top plan view of the trailer shown in Fig. 1 showing the arrangement of the upper tracks for supporting the upper layer of automobiles;

Fig. 4 is a view similar to Fig. 3 but with the top section of the trailer cut away to show the arrangement of the lower automobile supporting tracks;

Fig. 5 is a rear end view of the trailer, with certain of the parts broken away;

Figs. 6A and 6B when placed in end-to-end relation, constitute an interior view in vertical section, taken at the position of the line 6—6 of Fig. 3 and showing the dock-height floor in stowed position, and with the loaded automobiles shown in dotted lines;

Figs. 7A and 7B when arranged in end-to-end relation constitute an interior view in vertical section, at the position of line 7—7 of Fig. 3, showing upper runway in stowed condition and the dock-height floor in freight carrying condition;

Fig. 8 is a view taken substantially along the lines 8—8 of Fig. 6B;

Fig. 9 is a view taken substantially along the lines 9—9 of Fig. 8;

Fig. 10 is a view taken substantially along the lines 10—10 of Fig. 7A;

Fig. 11 is a view taken substantially along the lines 11—11 of Fig. 10;

Fig. 12 is a view taken substantially along the lines 12—12 of Fig. 6A;

Fig. 13 is a view similar to Figs. 6A and 6B showing a modified form of dual-purpose trailer construction;

Fig. 14 is a view similar to Figs. 7A and 7B, of the construction shown in Fig. 13;

Fig. 15 is a view taken substantially along the lines 15—15 of Fig. 14;

Fig. 16 is a view taken substantially along the lines 16—16 of Fig. 13;

Fig. 17 is a bottom view of a ramp member;

Fig. 18 is a view taken substantially along the lines 18—18 of Fig. 15;

Fig. 19 is a view taken substantially along the lines 19—19 of Fig. 18; and

Fig. 20 is a view taken substantially along the lines 20—20 of Fig. 19.

Referring to the drawings, the numeral 1 indicates generally a trailer body having rear wheels 2 and a fifth wheel engaging portion 4 adapted to rest upon a fifth wheel 6 at the rear end of a highway tractor, a portion of which is diagrammatically shown at 8, and having drive wheels 10. As best shown in Figs. 6A and 6B, the trailer 1 comprises a pair of longitudinally extending lower structural side frame members 12, one located on either side of the trailer. Members 12 each have an elevated frontal portion 14 which accommodates the tractor connection, and then sweeps downwardly in an arcuate portion as at 16. The rear end of each member 12 is joined, by an arcuate section 20 (to go over the trailer wheels 2), to a rear end section 22. Preferably, and as illustrated, wheels 2 are of the dual type, although, of course, tandem arrangements in which the lower automobiles may be driven or positioned between the trailer wheels, as known in the haulaway art, may be used.

The two side members 12 are connected together at spaced intervals by transversely extending box-section cross frame members 24 upon which portions of the lower automobile supporting means or tracks 27 are supported.

Preferably, the sides of the trailer are of the light weight unit construction of the semi-monocoque or semi-stressed skin type, and these sides are preferably prefabricated in suitable jigs and have a light grid-like frame of preferably vertically extending hollow or box-type frame members 26 and preferably horizontally extending and hollow or box-like frame members 29 secured together, preferably in one plane, as by welding. An outer and stressed skin preferably of sheet metal is rigidly secured to frame members 26 and 29 as by welding. The lower and upper edges of these composite trailer side walls are secured, respectively, to the said lower side frame members 12 and to horizontally longitudinally extending top side rails or frame members 28, as by welding. Other boxlike sections 29a extend obliquely and are also welded to the bars 26. As is usual in trailer construction, the front end of the trailer framework is curved as at 30 (Fig. 3) to permit relative turning between the tractor 8 and the trailer body 1.

The rear end portion of the trailer 1 is provided with a transversely extending platform or floor 31 resting on supports 32 which interconnect opposite box members 26 of the two walls of the trailer and are arranged at a suitable height, of the order of 4 feet, whereby when the trailer body 1 is backed up to a loading dock, the platform 31 carried by these supports 32 will be at substantially the same elevation. The front portion of the trailer 1 with the exception of the portion which receives the forward end of the tracks 27 is provided with a suitably supported permanent platform 34, which is preferably at the same height as platform 31.

In further accordance with the invention, the drop center portion of the frame structure is floored, which flooring serves or may serve several important purposes, i. e., it will prevent splash or road dirt from reaching the lower portions of automobiles carried thereabove or of freight articles carried in said drop center portions, and also prevent loss of freight articles carried, for example, on the cross frame members of the frame structure, or on runways 27, or otherwise supported in said drop center portion. Also, this flooring may serve to directly support freight articles and/or automobiles carried in this drop center portion.

In the embodiment now being described, the lowermost automobiles are carried on and guided into position by tracks or runways 27 one of which is located adjacent each side of the vehicle. These runways 27 have generally horizontal central portions and forward and rear inclined portions 27a and 27b, which lead from the lower portion to the elevated platforms 31 and 34, and are so inclined as to prevent hanging-up of the under body portions of automobiles being driven into and out of the lower decked positions. These runways in themselves thus partially floor the drop center or well portion of the trailer structure and, when handling dry freight, may be employed to support the same in the well. Additionally, in the embodiment now being described, the partial flooring afforded by the runways 27 is supplemented and completed by a continuous under floor 12a, which may be formed of transversely corrugated sheet metal and may be welded or otherwise suitably secured to the under side of the cross frame members 24 and the side frame members 12. Thus, it will be seen that while the horizontal portions of the track members 27 are preferred as a matter of convenience for guiding automobiles in or out of the trailer, yet it is not essential that separate tracks or runways, as distinguished from a continuous floor, be provided, in the broader aspects of the invention.

The lower tracks are welded to the front end of the platform 31 and extend downwardly into engagement with one of the cross members 24 which is located forwardly of the rear trailer wheels 22 and then extend substantially along the tops of the cross members 24 forwardly to a short distance rearwardly of the forward arcuate section or portion 16 after which they again extend upwardly to a level slightly below the level of the forward portion 14 of the members 12. If desired, the extreme forward end portions of the lower tracks may extend slightly downwardly so that when a motor vehicle is in position as shown in dot-dash lines of Fig. 6A, the shape of the tracks will tend to hold the vehicle in the desired location. Likewise, a short section of the lower tracks just rearwardly of the place in which the lower track inclines upwardly, may be slightly inclined to provide for receiving the rear wheels of a motor vehicle, as shown in the dot-dash lines of Fig. 6A. The length of the inclined track portion which extends downwardly from the platform portion 31 is preferably arranged so that its length substantially coincides with the wheel base length of the average motor vehicle which the trailer will be called upon to transport, substantially as shown by the motor vehicle in dot-dash lines of Fig. 6B.

Both the rigidly secured, partial flooring sections or tracks 27, as well as the underflooring 12a, are stressed and materially strengthen the vehicle as a while. It will be apparent that the tracks 27 may constitute additional lower longitudinal frame members by welding or otherwise suitably affixing them to the cross beams 24.

With the automobiles arranged as shown in back-to-back relation, with the hood of the forward automobile positioned over the fifth wheel 4, and the hood of the rearward vehicle extending rearwardly of the trailer 1 so that it is substantially over the rear trailer wheel 2, a second set of automobiles may be carried above the first set of automobiles and in nested relation therewith (i. e., the upper portions of the lower automobiles may be received between the wheels, and in the underbody clearance, of the upper automobiles, as illustrated) upon upper tracks 40 and 42. The open space between the upper tracks 40 and 42 permits this nested relation.

The upper tracks 40 and 42 are substantially identical and each are composed of a plurality of track sections 44, 46, 48, 50 and 52 which are supported on swinging wings or brackets 54 and 56 when the trailer is arranged for carrying automobiles. The brackets 54, as shown in Fig. 7A and 7B are preferably formed of tubular members. Each bracket 54 comprises a tubular member bent to form two portions 54a and 54b which extend substantially at right angles with respect to each other. The portion 54b is journaled within one of a plurality of U-shaped members 62 which have their outwardly extending open end portions welded one to either side of the uprights 26. The other portion 54a is adapted to be swung into a position in which it extends inwardly from the uprights 26 in a substantially horizontal plane for supporting the underside of the upper tracks 40 or 42. Obliquely extending supporting members 60, one for each bracket 54 respectively, have one end portion secured as by welding to the outer extending end portion of the portion 54a and have their other end portion journaled within a second U-shaped strap member 64. The members 64 have their outer extending end portions welded to the upright 26 similarly to the members 62. The brackets 56 are similar to the brackets 54 and have portions 56a and 56b and members 66. The portion 56a, however, has an extending portion 56c which projects inwardly of the trailer so that it may be removably secured (as described below) to a similar portion 58c of a second bracket 56 carried by an upright 26 on the other or opposite wall of the trailer body 1. The portion 56c is preferably offset upwardly from the plane of the portion 56a to form a shoulder 68 against which the inner edge of the tracks 40 or 42 may be positioned whereby the distance between the two tracks is determined.

The positioning of the brackets 56 will to some extent depend upon the size and shape of the automobiles which the trailer is designed to transport on the lower ramp or tracks 27 and 27a. The brackets 56 are preferably arranged as shown at periodic intervals whereby the opposite brackets 56 may be clamped together by means of overcenter clamping means 68. These brackets 56 thereby serve not only to locate the inward position of the upper tracks 40 and 42 but also serve to support the side walls of the trailer against deflection during movement of the trailer, and thus constitute part of the strength framing of the trailer.

Additionally, as shown in Fig. 1, the side walls of the trailer 1 are interconnected by a pair of frame forming, removable cross bars 69 and 71 which extend between the top rails 28. The bar 69 is located substantially midway of the trailer 1 while the bar 71 is at the rear end thereof. When the trailer 1 is used for hauling automobiles, the bar 69 is removed and left out, since the brackets 56 will then be interconnecting the side walls. The bar 71 is removed for loading purposes and may then be repositioned. Each of the bars 69 and 71 are removably held in place by king pins 73 which extend through aligned apertures in brackets 74, carried by the members 28 and fingers 75, carried by the bars 69 and 71.

Reinforcing plate members 70 (one only of which is shown in Fig. 6B) are suitably secured as by welding each side of the trailer 1 adjacent its rearmost vertical support 26. One plate member 70 is welded to one of the horizontally extending box-supporting bars or members 29 and an obliquely extending bar 29a which extends from the rear end of the trailer 1 and to the rearmost support 26 at one side of the trailer while the other is similarly carried by the other side of the trailer. As may be seen more in detail in Figs. 8 and 9, each member 70 has an L-shaped bracket 76 suitably welded to its inward face. A lateral portion 78 thereof positions one end of a rear transverse supporting bar 80.

The supporting bar 80 terminates at each end in a clamping device or head 82. The device 82 is preferably a forging having a central aperture 84 extending vertically therethrough in which is fulcrumed a locking catch 86 and which catch is urged in a counterclockwise direction by means of a spring 88. The outer or nose end of the head 82 has a pair of spaced downwardly extending pins 90 which are received within apertures 92 in the portion 78. With the locking member 82 in position with the pins 90 extending through the apertures 92, the spring 88 is operable to move the latch 86 into latching engagement with the under surface of the lip portion 78 of the angle brackets 76 whereby the rear cross bar 80 is locked in position. The rear cross bar 80 supports the extreme rear end portion of the track sections 44 of the two tracks 40 and 42.

All of the sections of the upper tracks 40 and 42 are generally channel shaped, having upwardly directed side flanges 94 and 96 and wheel supporting web portions 98 (Fig. 10). The track sections 44, 48 and 52 of each of the tracks 40 and 42 are substantially straight, and in the present embodiment are hinged to the adjacent walls of the trailer 1 by means of hinges 104, as is perhaps best shown in Fig. 10. Each hinge 104 is of U-shaped strap-like form, and is connected at its end to a laterally turned extension 99 of the corresponding track 40 or 42. Each hinge 104 is pivotally connected to a pin 105 which is in turn supported on a corresponding upright 26. When these straight track sections 44, 48 and 52 are not in use, they may thus be hinged upwardly against the side walls of the trailer 1, to the stowed positions shown in Fig. 1. As illustrated, latch type retainers 100 may be provided to hold these track sections in the stowed position.

In converting the structure for transporting automobiles, the brackets 54 and 56 are rotated in the hinge straps 62 and 64 so that they extend inwardly, substantially perpendicular to the side walls of the trailer. Thereafter, the track sections 44, 48 and 52 are released from their catches 100 and are pivoted downwardly to the supported positions shown, for example, in Fig. 10. It will be noticed that the under sides of each of the hinge sections may, if desired, be provided with means to interlock with the wings 54 and 56. Such interlocking means, indicated at 101 in connection with the track sections 44, may be used on the other track sections and may be supplemented as desired by other holding means to removably secure the sections in place.

The track sections 46 are of substantially the contour shown in Fig. 6B and are not hinged to the side walls of the trailer but are lifted and set into place upon lips 106 which are carried by the adjacent end sections of the track portions 44 and 48 as shown in Fig. 6B and 7B. The track sections 46 not only ride upon the lips 106 but will also ride upon the intermediate brackets 54 or 56.

The forward track sections 50 are similarly arranged and are removably set into place to interconnect the adjacent end sections of the track sections 48 and 52 whereby a substantially continuous upper track extending end-to-end of the trailer is provided.

The rear cross bar 80 has spaced pairs of ears 110 (Fig. 5) which extend rearwardly therefrom and are aligned with the end portions of the track sections 44. These ears 110 have aligned apertures for receiving pins which extend through similarly apertured ears in ramps (not shown) by which automobiles may be driven onto the tracks 40 and 42 either from a loading platform or from the surface which supports the wheels 2. Similar apertured ears (not shown) may be provided on the rearmost support 32 whereby ramps may be arranged to permit automobiles to be driven onto the rear platform 31 and thence to the tracks 27 and 27a for loading of the trailer 1 when loading docks are not available. After automobiles have been loaded on the upper and lower tracks as shown in dot-dash lines in Figs. 6A and 6B, the ramps secured by pins to the ears 110 may be removed and thereafter the rear trailer doors 112 may be closed and secured in closed position by suitable and conventional truck door-securing hardware.

When it is desired to use the trailer for hauling dry freight, the track sections 46 and 50 are lifted from plate and the track sections 44, 48 and 52 are rotated about their hinges into a position against the adjacent side walls of the trailer wall, being held in this position by the hooks 101. The brackets 54 and 56 are rotated into a position against the side walls and the rear cross bar 80 is removed. The bar 80 is removed by manually moving the protruding portion 87 of its latches 86 against the force of the springs 88 to remove the latches 86 out from holding engagement with the portions 78 of the brackets 76 after which the bar 80 may be removed. The conversion is completed by establishing the dock-high floor, now to be described.

Swing-up U-frames or yoke members 150 are hinged to the lower cross beam 24 intermediate the adjacent edges of the lower track sections 27 and 27a and are so proportioned in size that when they are pivoted into a substantially vertical position the top horizontally extending cross bars 152 thereof will lie substantially in a horizontal plane. The yokes 150 each have a horizontal member 152 and legs 156 which extend outwardly therefrom and parallel to each other and which are hinged at their extending end portions to the cross bars 24. Certain of the adjacent yokes 150 may be connected together for concurrent movement upwardly into a substantial perpendicular or floor supporting position. As shown in Fig. 6B, bars 158 interconnect the second from the rear and the third from the rear yoke members 150. These bars 158 are loosely connected to the horizontal sections 152 of these yokes 150 by means of straps 160 which are welded at either end to the bar 158 and extend around the adjacent horizontal section 152. When these yokes 150 are raised into position they form a set of spaced supports for the foldable floor which is then moved into position for supporting the dry freight.

The foldable floor 170 comprises pairs of sections 172, 174, 176, 178 and 180 which are all similar and comprise two sections of flooring material hinged at their adjacent edges to each other. The section 182 which is closest to the side wall of the trailer is hinged thereto. The other section 184 of each of the sections 172 through 180 may be grasped and lifted outwardly whereby the sections 182 and 184 are unfolded and laid on top of the yoke supports 150. The floor sections 182 and 184 may have angle supports 190 (Fig. 10) extending transversely thereof which are notched to receive the bars 158 and which are also so arranged that the yokes 150 will abut thereagainst to prevent accidental pivoting of their hinged end portions whereby the floor would become unsupported. The floor sections also may be provided with longitudinally extending angle brackets 191 which are notched to receive the horizontal member 152. Hooks 192 hold the floor sections in folded position upwardly against the side walls of the trailer when the floor is not being used.

As shown in Fig. 5, suitable brackets 186 may be secured adjacent the top edges of the sides of the trailer 1 and on top of these supports 186 a tarpaulin or other structure 188 may be placed to form a top for the trailer which is now in condition for transporting general merchandise in the usual manner.

In Fig. 11 there is shown in detail a stop construction which limits upward movement of the yokes 150 to slightly more than 90°. This hinge member for the yokes 150 comprises a U-shaped member 200 having its connecting portion suitably secured as by welding to the cross supports 24. The extending portions of the U-shaped member 200 have aligned apertures 202 in which a pivot pin is secured and which pivot pin also extends through an aperture in a lower pin extension 204 of the hollow legs 156. A stop member 206 against which the extension abuts is provided to limit clockwise rotation of the yoke members 150 about their pivot pins 203.

The horizontal extensions 56c of the upper-track supporting brackets 56 are preferably formed of hollow tubing. The brackets 56 arranged along one side wall of the trailer carry an overcenter toggle locking mechanism 68 (Fig. 12) which comprises a pair of arms 210 and 212 joined together at one end by a cross member 214 and having their other ends pivotally carried on a pivot pin 216 which is carried by one of the bracket sections 56c. A pair of hook members 218, one located on either side of the section 56c, is pivotally carried by the side arms 210 and 212 on pivot pins 220. The location of the pins 220 and 216 is preferably such that, with the connecting member 214 in engagement with the top surface of the bracket portion 56c, a force tending to pull the hook members 218 toward the other wall of the trailer will exert a downward force on the member 214 tending to rotate the arms 210, 212 in a counterclockwise direction. The pins 216 and 220 are further arranged so that upon a predetermined clockwise movement of the arms 210 and 212, the pin 220 will pass the line of centers of the pins 216 and the catch portion of the members 218 so that the locking mechanism acts in an overcenter manner. The bracket sections 56c along the opposite side of the trailer carry a locking pin or bolt 222 which is reciprocal within this last-named bracket portion 56c. These last-named bracket portions 56c each have a pair of elongated slots 224 which receive a bolt 226 carried by the locking pin 222 whereby the movement of the bolt 222 into and out of the bracket section 56c is limited. The pin 226 extends outwardly of the bracket portion 56c and the catch portion of the hooks 218 is adapted to hook over the extending end portions of the pin 226 whereby, when the arms 210 and 212 are moved in a counterclockwise direction, the hooks 222 will pull the pin 226 thereby sliding the locking pin 222 into telescoping engagement with an opposite bracket portion 56c whereby the pair of brackets 54 are locked together. A sleeve 228 is provided to fill in the gap between the adjacent ends of the pairs of bracket sections 56c so that with the locking mechanism 68 in locked position the pairs of brackets 56 will be rigidly connected together.

In Figs. 13 through 18 inclusive there is shown a somewhat modified form of trailer 300. The trailer 300, which in general construction is quite similar to that of the trailer 1, has a pair of spaced lower supporting members 312. These members 312 are joined together by spaced box-section lower connecting members 324 and the side walls have upright supports 326 spaced along the side wall of the vehicle secured at one end to the member 312 and at its upper end to the top member 328 and interconnected by horizontal and oblique sections 329 and 329a. The trailer 300 has the lower tracks 327 which comprise flat plate members similarly arranged to the tracks 27 for the reception of two automobiles and has a rear platform 331 corresponding to the platform 31. The trailer 300 also has upper tracks 340 and 342 whereby a second or elevated row of automobiles may be carried in the trailer 300 above the lower set of automobiles on the tracks 327 and 328. The upper set of tracks 340 and 342 comprises several straight sections 350 along each side wall of the trailer. These track sections 350 include plank members 390 (Fig. 17) having flat upper and lower surfaces, the length of which is equal to the width of the trailer 300 whereby when they are not used as longitudinal track sections for supporting motor vehicles, they may be used as a lateral portion of the dock-height floor used to carry general or dry freight. These plank members 390 comprise wood strips arranged in side-by-side relation secured together by metal angle members (Fig. 17). Certain angle members 391 extend transversely of the plank members 390 and certain other angle members 392 extend longitudinally thereof. These members 391 and 392 are interconnected with diagonally extending angle members 393.

In the embodiment now being described, the upper runways and the dock-height floor are supported upon cross members or bars 400, which in turn are removably supported by cooperating side supports located on the trailer walls. More particularly, the runway side supports are in the form of short rack-like pieces 399 having upwardly facing teeth. The pieces 399 are secured to the uprights 326 of the trailer 300 as by welding.

The details of construction of the side supports 399 and cross bars 400 form no part of the present invention and the illustrated members are of a commercially available type and so need only brief description herein.

Referring particularly to Figs. 15 and 18 through 20, each cross bar 400 comprises a generally rectangular body, formed, for example, of two wooden beams 410, separated by a reinforcing Z-bar 412, these elements being held in assembled relation to each other by through bolts 414. Each bar comprises a pair of end heads 415 and 416 which are alike except that while head 415 is immovably fixed with respect to the body of the bar, the other head 416 is telescopic with respect thereto. Only the telescopic head is shown in detail herein. This head 416 is provided with a neck 418, which is telescopically received in a sleevelike opening 420, formed in the bar, and is held against rotation therein by a pin 422. Pin 422 rides in a slot 424 which limits the telescoping movement of the head relative to the body of the bar. Each head 416 comprises a fixed jaw 426, having on its under surface a series of toothlike projections 428, which mate with the toothlike projections on the rack pieces 399. Each head 416 also includes a latch plate 430 which, in the locking position of Figs. 18 and 19, underlies the associated rack piece 399 and holds the teeth 428 in engagement with the corresponding teeth of the pieces 399. Each jaw 426 also has side walls 432 and 434 between which the corresponding rack piece 399 is received. These portions 432 and 434 limit movement of each head 416 in a horizontal direction at right angles to the length of the rack piece 399. Each latch plate 430 is pivotally connected to its associated head by means of a stud 436, which may be turned so as to swing the latch piece through an angle of about 180° from the illustrated locking position to a retracted position in which it permits the bar to be readily lifted away from the rack piece. Thus, it will be appreciated that the cross bars 400 are releasably connectible to the rack pieces 399 and when so connected, afford firm supports for the track sections 390.

The transverse angle members 391 of the plank members 390 adjacent the ends thereof are spaced inwardly substantially one half the width of the cross bars 400 whereby they abut the side walls of the bars to hold the sections 350 through 350 in place. The longitudinally extending angle members 392 are spaced inwardly from the edges of the plank members 390 to position the plank members when they are used to form a platform or floor when the trailer 300 is used to carry dry freight, as will be evident below.

Intermediate the bars 400, I provide additional track supporting members 402 in the form of transversely extending members more clearly shown in Fig. 16. These tie members 402 are somewhat similar to the brackets 53 (Fig. 7A) except that the member 402 is fabricated in one piece and instead of pivoting and swinging about the straps 362 and 364, it merely slides therein whereby it is bodily removable therefrom. Stops 403 are provided on the uprights 326 to prevent jamming of the members 402 into the straps 362 and 364. As do the brackets 56, the brackets 402 have a raised center portion 403 which determines the location of the track sections 350 with respect to each other.

When it is desired to remove the equipment for carrying automobiles, the track sections 350 are bodily removed from the tie bars 400 and the brackets 402 after which the tie bars and brackets are removed, the tie bars being removed by unlocking the locking connections 415 and 416 between the bar and the track sections and the brackets being removed simply by lifting them out of their supporting straps 362 and 364. In order to provide a platform bottom for the trailer 300 so that it is useful for hauling general merchandise, a pair of longitudinally extending racks 404, similar to the rack sections 399, are provided. These racks 404 extend substantially the full length of the trailer 300 and are secured to the walls thereof, as by welding, to the uprights 326. A number of tie bars 400 are arranged transversely of the trailer to the two toothed strips or racks and spaced at the same width as the width of the track members 350. The track members along with the required additional similar members are then laid transversely of the trailer to form a general freight supporting platform resting upon the tie bars 400. It will be evident that with the track or plank members in this position, the before-mentioned longitudinally extending angle members serve to engage the side walls of the tie bars 400 to hold the plank members in position.

If desired, additional racks may be provided which extend longitudinally of the trailer 300, one set 406 being shown adjacent the top portion of the trailer in Fig. 15, and another set 408 being shown just above the level of the general merchandise supporting platform. Thus, tie bars 410 may be provided to extend transversely of the trailer to provide various freight loading arrangements. For example, bars 410 may support vertical bars 407 similar to bars 400, for giving bulkhead support to the freight.

As in the previous embodiment, it is preferred to completely floor the trailer. In this instance, floor 440 which may, for example, be of corrugated sheet metal, is laid over the main cross beams, but underlies the lower automobile runways.

Summarizing the operating characteristics of the two illustrative embodiments of the invention which have been specifically described above, it will be recalled that Figs. 6A and 6B collectively show the first form in condition to transport automobiles. Under these conditions, the foldable floor sections are folded up against the side walls of the trailer and are latched in place. The supporting yokes therefor in turn are in their lowered or collapsed positions so that the dock-height floor and its supporting structure do not interfere with movement of the automobiles into or out of the trailer. Under these conditions, the wings 54—56 are swung outwardly, the hinged upper track sections are lowered thereon, and the bodily removable track sections 46 and 50 are in operative position. In usual practice, the front lowermost automobile is first driven in, then the rear lowermost automobile is driven in after which the wings may be swung out and the upper tracks lowered, suitable ramps being provided at the rear as aforesaid so that the two uppermost automobiles are successively driven into place.

It will be understood that in both of the illustrated embodiments of the invention, both the upper and lower automobiles are held in position by suitable clamping means or hold-down chains which are conventional in this art and so have not been described in detail.

Unloading is, of course, performed in the reverse order to the loading, as described above.

A conversion of the trailer or adjustment of the equipment to its freight carrying positions is accomplished by lifting away the removable upper track sections, and stowing the same, swinging upwardly the swingable upper track sections and latching them in place, turning the wings 54 and 56 into the stowed position of Figure 1, and thereafter elevating the yokes 150 and lowering the dock height floor sections into place. When it is desired to carry light or low density freight in the well or drop center portion, it is put in place between the raised yokes but with at least one of the hinged floor sections raised to permit insertion. Thus the light freight in the drop center portion is loaded before the main freight is loaded on the floor above it.

As will be apparent, in the first illustrated embodiment, most of the several pieces thereof are nonremovably mounted in the vehicle structure, and hence are pilferproof.

In the second illustrated embodiment, the conversion and the operation under the two loading conditions are generally similar to the foregoing. Here, however, for carrying automobiles the cross bars 400 are secured in place on the rack sections 399 (thus additionally strengthening and stiffening the vehicle as a whole) and also the intermediate supports 402 are put into position, thus supporting each of the planks at a plurality of points along the wheel supporting lengths. Under these conditions, any of the cross bars 400 which are not utilized for upper runway supporting purposes, are stowed, as, for example, in the drop center or well section of the vehicle. It will be noted that the same structure members are employed to support upper automobiles on the one hand or the main freight floor on the other hand. Loading and unloading of automobile takes place in the manner described in connection with the first embodiment.

In converting the present embodiment for general freight holding purposes, the planks 390 are lifted away from their supports, the yokes 402 are removed, and the cross bars 400 are released from their side supports. Thereafter, the previously used cross bars 400 and the remaining previously stowed ones are connected across the continuous lower dock high side rails, the preferred spacing between cross bars being in general equal to the width of the planks 390. With the cross bars so positioned, a continuous dock high floor, composed of planks 390, may be laid upon and secured to the cross bars 400, this dock high floor, as in the previous embodiment being, for the sake of convenience, at substantially the same elevation as the front and rear raised platform areas. As in the earlier embodiment, also, stowage of freight in the drop center or well section may take place either before or after the cross bars 400 are put in place at the dock height. Here again, the cross bars 400 strengthen the vehicle when in either their upper or lower position.

An important advantage of both forms of this invention is its adaptability to mixed loads. These are important for small or spot deliveries of dealers where, for example, 1, 2, or 3 automobiles are to be delivered and the unused space may be employed for general freight; or, general freight may be picked up midway of a trip. This has not been heretofore possible, and adds to the revenue-earning capacity of the present vehicles. This ability to carry split or mixed loads results from the sectional character of the dock height floor sections (note that the mid sections are divided close to the center line of the vehicle to permit the carrying of a forward or rearward automobile only), the individual swing up yokes of the first embodiment or the individual floor supporting cross bars of the second embodiment and the correspondingly sectionalized upper runway portions which also divide close to the center line of the vehicle or at least to permit the carrying of a front or a rear automobile only on the individual swing out wings of the first embodiment or the individual upper track supporting bars of the second embodiment.

It will be apparent that several types of mixed loads may be achieved as, for example, one automobile may be carried in the upper forward position or in the lower forward position or two decked automobiles carried in the forward position. If three automobiles are to be carried, the lower rear position would be left clear and utilized with its floor in place, for freight.

While as hereinbefore disclosed, the two end or platform portions of this drop center vehicle are substantially at loading dock height, yet it will be appreciated that within the purview of this invention there may be some material deviation from this approximately four foot height in so far as the user would be willing to employ ramps to drive up or down from standard loading docks.

Similarly, the height of the main floor may vary under the same considerations and in addition, within the purview of this invention, the floor need not be exactly at the height or heights of the end portions so long as it is positioned close enough to the height or heights of the end portions to permit easy driving up or down or into or out of the vehicle. Thus, in the present specification, the term "dock height" is used generically to mean a height close enough to that of standard loading docks to permit practical operation therewith when moving heavy freight into or out of the trailer and loading or unloading heavy freight.

Further, by way of summary, it will be noticed that both of the above embodiments provide the generically important feature of ready convertibility between an automobile carrying and general or dry freight carrying conditions; both forms are characterized by the movability of the main freight carrying floor between a freight carrying position and a stowed position in which it does not interfere with lowermost automobiles; and both forms are characterized by the movability of the upper automobile carrying runways so that they may be stowed in positions in which they do not interfere with the loading of general freight. In the present specification, the term "movable" as applied to the floor structures as well as applied to the runway structure, is used generically to include various convertible arrangements or mountings for the various elements. In both forms, the three level loading characteristics as disclosed above are present, and both forms further achieve maximum space utilization, through use of the auxiliary storage space afforded by the drop center sections.

Although only two specific embodiments of the invention have been described in detail, it will be appreciated that other and differing arrangements may be utilized, all within the purview of the invention.

What is claimed is:

1. A general freight carrying highway van of substantially maximum legal size (as determined by the highway laws of the various states) and convertible to carry two layers of automobiles having a total weight materially less than the maximum general freight load comprising a body having substantially closed longitudinal frame forming sidewalls, said body having a rear opening for loading and unloading purposes and a rear platform adjacent said opening and at substantially loading dock height, said body having a closed bottom spanning the space between and interconnecting and bracing the lower portions of the sidewalls and being located beneath the level of the rear platform, said closed bottom providing a storage surface for at least the full width of one end of an automobile, movable floor forming members supported by the sidewalls so that they provide a freight supporting surface over said closed bottom at substantially the same level as the platform, movable track forming members supported by the sidewalls providing a storage surface for automobiles at a level above said floor forming members, certain of said members being interconnected with the opposite sidewalls to form tie bars and transverse frame elements therebetween.

2. In a general freight carrying highway vehicle convertible to carry two superimposed layers of automobiles and having opposite sidewalls, convertibly removable strut forming transverse frame members connected between said sidewalls at their upper ends to provide head room above a lower level freight carrying floor, and upper layer automobile carrying supports convertibly movably mounted on said sidewalls materially below their upper ends but so located that the automobiles carried thereby project above the top of the vehicle, said supports including convertibly movable means to form strut forming transverse frame members at this lower level, between the upper and lower layers of superimposed automobiles whereby one of said two levels of transverse frame members interconnect the opposite sidewalls in the conversion condition to carry freight and the other of said two levels of transverse frame members interconnects the opposite sidewalls in the different conversion condition to carry automobiles.

3. The organization of claim 2 in which said supports form automobile wheel carrying tracks and in which said supports are swingably mounted to fold up against and below the tops of the sidewalls in inoperative position.

4. The organization of claim 2 in which said transverse frame members associated with said upper supports extend from one sidewall to the opposite sidewall and are removably and rigidly connected to each sidewall and said upper automobile supports rest on said members and are supported thereby.

5. For use in a highway freight carrying vehicle convertible to carry two superimposed layers of two full-sized automobiles with sidewalls and an open end with substantially equilevel freight carrying platforms at substantially standard loading dock height at each end over its wheels and with a lower level drop center portion wide enough and open above it to receive therein at least one end and a substantial portion of the bulk of each of two lower level automobiles and with supporting portions on the vehicle along the drop center portion, conversion structure to change over said vehicle for carrying of general freight on a movable floor over said drop center portion and at substantially loading dock height comprising, in combination, a plurality of swingable floor forming sections to be positioned in a common plane to coact to span and cover said open drop center portion from side to side and end to end to form a substantial extension of said end platforms, hinges secured along the edge of said sections to swingably mount them on each sidewall for motion between an operative freight carrying position, in which their total width is wider than said automobile to be transported and equal to the inside width of said vehicle, and a non-automobile interfering inoperative position swing up against the vehicle sidewalls, said sections having flat top surfaces and being thin to avoid unwanted projections into the vehicle in their inoperative position, and a plurality of movable engaging and floor supporting members to extend horizontally across the vehicle width spanning the joint between floor sections at least as long as the combined width of said floor sections and adapted to be secured by said supporting portions on the vehicle in positions spaced longitudinally of the vehicle and intermediate the ends of said combined floor sections over said drop center portion.

6. Apparatus for insertion in a highway transport vehicle of the type having an open top and upright substantially closed side walls that form major longitudinal frame members and a rear platform at substantially loading dock height of at least the width of and adapted to support at least one end of a tilted full-size automobile over the transport vehicle rear wheels and a wellforming surface forward of said platform and lower than the platform and substantially at required ground clearance level and being wider than and adapted to support the other end of said tilted automobile with at least a substantial portion of its bulk in said well, said apparatus serving upon insertion to cross brace the opposite side walls and to enable the vehicle to convertibly and selectively carry general freight on a level floor at substantially loading dock height or two levels of superimposed automobiles, comprising flat panels of no greater thickness than one half the difference between the width of a full size automobile to be transported and the inside distance between the opposite sidewalls, a plurality of beams for supporting the panels, connectors for movably mounting the beams in the vehicle between the sidewalls, said beams and connectors being adapted to support the panels in substantially the plane of the platform and over the surface, elongated guideways for the wheels of an upper level automobile, transverse arms rigidly secured to the guideways having hinge means at the ends thereof adapted for movable connection to the sidewalls substantially above the level of the platform, beams for supporting the guideways, connectors for movably attaching the ends of the beams to the opposite sidewalls to support the guideways, and additional connections for interlocking the beams that are attached to opposite sidewalls, said connections being adapted to transmit forces longitudinally of the beams whereby the latter may reinforce the sidewalls.

7. In a highway vehicle having side walls, said vehicle having upper and lower supports supported on the side walls and adapted to carry upper and lower layers of automobiles with the plane of the tops of the side walls extending approximately midway through the upper layer automobiles, the upper supports being movably mounted on said side walls for movement to a stowed position, the lower supports being located at substantially the required ground clearance level and adapted to carry at least an end and a substantial part of the bulk of one lower layer automobile below loading dock height, movable freight carrying floor members supported on said side walls to overlie said lower supports and located at about standard loading dock height level and being of a size and width so that when in open inoperative position they leave an opening large enough to receive a lower level automobile carried by said lower supports, and movable roof means supported on the side walls and located adjacent to the tops thereof.

8. For use in an end loading highway vehicle convertible to carry two superimposed layers of full-sized automobiles, such vehicle having a body with side walls and openable at its rear end for loading and end platforms, including a platform over its rear wheels at substantially loading dock height and a well between said platforms forming a lower level central portion at the required minimum ground clearance level, wide enough and long enough and open above it to receive therein at least one end and a substantial portion of the bulk of each of two lower level automobiles, structure to convert said vehicle for selective adjustment from a condition for carrying automobiles to a condition for carrying freight on a movable floor over said central portion at substantially the same level as said end platforms, said structure comprising, in combination, a plurality of movable flat topped floor sections to be positioned side by side in a common plane and having a combined width wider than the width of an automobile and adapted to span said central portion between said side walls and a length to cover said well from end to end thereof, movable floor support members each to engage under at least two of said side by side floor sections across the width of said vehicles to support them at a level substantially the same as said end platform, carrying members to secure said floor support members to said body, and said floor sections and said support members having male and female interengaging portions to prevent relative lateral displacements therebetween.

9. In a highway general freight transport vehicle convertible to carry two superimposed layers of standard size automobiles having sidewalls and also having front and rear fixed platforms forming first and second storage surfaces at substantially standard loading dock height and each adapted to support one end of each of two tilted lower level automobiles and a fixed floor between and below and substantially parallel to the platforms forming a third drop center storage surface at substantially the required ground clearance level, means adapting the third surface to support the wheels at one end of each of two tilted lower level automobiles, movable track means for supporting the wheels of two upper layer automobiles defining a fourth storage surface above said surfaces, said track means being mounted on the sidewalls and including at substantially the same level transverse frame means acting between opposite sidewalls and being convertibly movable to a non-interfering position with respect to the space between the sidewalls for freight or freight loading crews, means forming a fifth storage surface adapted to carry general freight comprising a convertibly movable floor mounted on said sidewalls so that in operative position it is in substantially the plane of the first and second surfaces, and in open inoperative position it does not interfere with either of the two tilted lower layer automobiles each having a substantial portion of its bulk below the operative plane of said floor, and a second cooperatively convertible transverse frame means movably connected between said opposite sidewalls in its operative position at a level above said floor to give head room to freight loading crews thereon and interfering with storage of said upper layer automobiles, whereby there are one of two different upper levels of convertible transverse frame means acting between said opposite sidewalls for each of the two conversion conditions for freight carrying and for automobile carrying.

10. In a highway vehicle convertible to carry general freight or two superimposed layers of automobiles, the combination of a vehicle frame structure including a pair of transversely spaced longitudinally extending vertical side frames disposed opposite each other and a longitudinally extending horizontal bottom frame extending between and rigidly interconnecting the lower portions of the side frames along a major part of the lengths thereof, said bottom frame being located at substantially minimum ground clearance level and a substantial distance below standard loading dock height, automobile track means located on a level that is a substantial distance above loading dock height, said means being connected to said opposite side frames and constructed and arranged to act as cross bracing for the side frames, said bottom frame being adapted to support an end of an automobile at substantially minimum ground clearance level, means located at one end of the vehicle frame structure and substantially above said ground clearance level for supporting one end of an automobile, whereby said bottom frame and said means can support an automobile in tilted position in which it occupies a space extending substantially above said loading dock high level, movable floor sections forming a general freight carrying surface located at substantially standard loading dock height level, said floor sections covering the entire projected area of said bottom frame in said dock high level, and movable floor section supporting members located beneath said floor sections and mounted on said vehicle frame structure to transmit load on said sections to said structure, said floor sections and members being movable to inoperative positions wherein they expose said space and thus permit an automobile to be carried on said bottom frame and means.

11. In a dual purpose highway vehicle that is adapted to support an automobile at ground clearance level or to support a load of general freight at standard loading dock height, said vehicle including a drop center body having longitudinally extending side frames on opposite sides thereof and a bottom frame extending throughout the drop center portion of said body and located at substantially minimum ground clearance level, means located rearwardly of the drop center portion and substantially above it for supporting one end of an automobile, said bottom frame being adapted to support one end of an automobile, whereby an automobile may be supported in tilted position with one end on said means and the other end on said bottom frame and when so supported will occupy a space extending substantially above the level of said loading dock height, a general freight floor located on said dock high level and formed of movable floor sections covering said drop center portion, and movable floor section supporting members supported on said body to transmit load thereto and engaging said floor sections to support them in operative position, said floor sections and members being movable to inoperative positions to expose said space and thus permit an automobile to be carried on the bottom frame and means.

12. The invention set forth in claim 11 wherein said floor sections comprise flat panels hinged to the side frames and swingable upwardly to vertical positions adjacent the side frames.

13. The invention set forth in claim 11 wherein said means for supporting one end of an automobile comprises a platform of substantial length at the rear of the body affixed to said side frames and located on said dock high level and acting in conjunction with said floor sections to form said floor.

WILLIAM O. BRIDGE.

References Cited in the file of this patent

UNITED STATES PATENTS

| Number | Name | Date |
|---|---|---|
| Re. 19,776 | Judd | Dec. 3, 1935 |
| 211,072 | Witham et al. | Dec. 17, 1878 |
| 1,229,714 | Clark et al. | June 12, 1917 |
| 1,735,800 | Snyder | Nov. 12, 1929 |
| 1,980,298 | Simning | Nov. 13, 1934 |
| 1,994,695 | Dolan et al. | Mar. 19, 1935 |
| 2,009,149 | Pierce | July 23, 1935 |
| 2,062,120 | Dondlinger | Nov. 24, 1936 |
| 2,085,214 | Francis | June 29, 1937 |
| 2,118,364 | Sheehan | May 24, 1938 |
| 2,146,567 | Dondlinger | Feb. 7, 1939 |
| 2,169,648 | Judd | Aug. 15, 1939 |
| 2,492,980 | Garnett | Jan. 3, 1950 |

FOREIGN PATENTS

| Number | Country | Date |
|---|---|---|
| 359,496 | Great Britain | Oct. 23, 1931 |